(12) United States Patent
Massey (10) Patent No.: US 6,331,114 B1
(45) Date of Patent: Dec. 18, 2001

(54) APPARATUS FOR CONTROLLING A REMOTE CONTROLLED AIRPLANE

(76) Inventor: Fred Massey, #50 E. Rivercrest, Houston, TX (US) 77042

( * ) Notice: Subject to any disclaimer, the term of this patent is extended or adjusted under 35 U.S.C. 154(b) by 0 days.

(21) Appl. No.: 09/378,911

(22) Filed: Aug. 23, 1999

(51) Int. Cl.⁷ .................................................. G09B 9/08
(52) U.S. Cl. ............................................ 434/32; 434/30
(58) Field of Search ................................... 294/220, 223, 294/232, 234; 434/29, 30, 31, 32, 37, 45, 55

(56) References Cited

U.S. PATENT DOCUMENTS

| | | | |
|---|---|---|---|
| 2,301,685 | * 11/1942 | De Florez | 434/37 |
| 3,005,267 | * 10/1961 | Decker | 434/30 |
| 3,141,634 | 7/1964 | Rhoads et al. . | |
| 3,204,952 | 9/1965 | Mitchell, Jr. . | |
| 3,526,043 | * 9/1970 | Frasca | 434/32 |
| 3,548,518 | 12/1970 | McRae . | |
| 3,564,134 | 2/1971 | Rue et al. . | |
| 4,386,914 | * 6/1983 | Dustman | 434/32 |
| 4,464,116 | 8/1984 | Schoolcraft . | |
| 5,015,187 | 5/1991 | Lord . | |
| 5,129,826 | 7/1992 | Munsch . | |
| 5,158,459 | * 10/1992 | Edelberg | 434/45 |
| 5,878,981 | * 3/1999 | Dewey | 434/32 |

OTHER PUBLICATIONS

Radio Controller Device from "The World of Model Aircraft" by Guy R. Williams, 1973.*

* cited by examiner

*Primary Examiner*—Sam Rimell
(74) *Attorney, Agent, or Firm*—Harrison & Egbert (57) ABSTRACT

An apparatus for operating a remote controlled airplane including a frame, a remote control unit received within the frame and having first and second joystick elements, a joystick controller cantably mounted to the frame so as to have a forward/backward movement and a side-to-side movement, a first linkage connected to the joystick controller and to the first joystick element and adapted to cause an up-and-down movement of tie first joystick element relative to the forward/backward movement of the joystick controller, and a second linkage connected to the joystick controller and to the first joystick element. The second linkage is adapted to cause a side-to-side movement of the first joystick element relative to the side-to-side movement of the joystick controller. A pedal structure is pivotally mounted to the frame so as to be pivotable about a central axis. A third linkage connects the pedal structure to the second joystick element. A throttle member is pivotally connected to the frame and has a fourth linkage connected to the second joystick element. A pair of front wheels are rotatably mounted to a forward end of the frame and a third wheel is rotatably mounted in a transverse plane to a rearward end of the frame. An actuator mounted on the joystick controller causes a motor to drive the rear wheel.

7 Claims, 11 Drawing Sheets

APPARATUS FOR CONTROLLING A REMOTE CONTROLLED AIRPLANE

TECHNICAL FIELD

The present invention relates to devices for controlling the movement of a remote controlled airplane. More particularly, the present invention relates to devices for simulating actual aircraft cockpits for the purpose of operating the remote control unit associated with a model airplane. Furthermore, the present invention relates to devices for mechanically operating the joystick elements associated with a remote control unit.

BACKGROUND ART

Radio control of models of aircraft, helicopters, cars and boats is typically accomplished using a hand-held radio transmitter having two joysticks and various switch controls which activate servo motors within the model. Using an aircraft model as an example, the radio has two joysticks; a first joystick controlling elevator and aileron servos in the model, and a second joystick controlling the rudder and the throttle for the engine of the model. The pilot typically stands holding the radio in both hands while manipulating the joysticks and switches to control the aircraft. The radio is often suspended from straps or other carrying means to allow some freedom for the operator's hands, particularly for flying models. In order to maintain visual contact with the model, the operator must rotate his body. To ease fatigue, many pilots choose to operate their radio control units while seated. However, this limits the maneuvering of the aircraft to air space in front of the chair in order to maintain easy visual contact. In many instances, the modeler will rest the radio in his or her lap to allow more freedom of the hands to operate the various switches and joysticks.

Often, with radio controlled model airplanes, the actual remote control unit does not, in any way, simulate actual flying conditions. The operation of the pair of joysticks is quite unlike the flying of an actual airplane. Although each of these joysticks controls important functions of the model airplane, they are not operated in the manner of standard aircraft. As such, the person operating the remote controlled model airplane will fail to experience a sensation similar to the actual piloting of an aircraft.

In the past, various devices have been designed in order to add the realism of flying the radio controlled model by increasing the similarity with an actual aircraft cockpit while reducing the model pilot's workload by supporting the radio and providing conventional controls within easy reach. An example of such a device is shown in U.S. Pat. No. 4,386,914, issued on Jun. 7, 1983 to Larry L. Dustman. This patent describes an apparatus for controlling the control members of a transmitter used for sending signals to a receiver in a model airplane. The flight controls in the model airplane are linked to the control system of the airplane by cables and pulleys or by push-pull rods. The transmitter is mounted on a base which is secured to the top of the platform between foot controls and the chair. A control stick is juxtaposed to the transmitter and between the transmitter and the chair. The control stick uses four coil springs so as to provide lateral movement of the control stick. The throttle of the airplane is controlled by a throttle lever which is pivotally mounted on a rack secured to the platform. Pivotal movement of the throttle lever causes relative movement of a cable secured at one end thereof and at the other end to a clamp which is secured to the free end of the stick of the transmitter.

U.S. Pat. No. 5,129,826, issued on Jul. 14, 1992 to R. J. Munsch teaches another type of radio controlled model pilot's station. This device provides a motorized rotatable seat to keep the model in view while positioning a throttle quadrant and other aircraft controls in positions in front of the pilot. This device basically reengineers the remote control unit so that it is not adaptable to being retrofitted to existing remote control units.

Various other patents have issued which relate to the operation of drone aircraft. U.S. Pat. No. 3,141,634, issued on Jul. 21, 1964 to Rhoads et al., describes a remote control system for operating a drone aircraft. This drone control system describes an early form of the joystick operation of the components of the aircraft. U.S. Pat. No. 3,204,952, issued on Sep. 7, 1965 to E. F. Mitchell, Jr., describes a model airplane guidance device which sends remote control signals to a model airplane. U.S. Pat. No. 3,548,518, issued on Dec. 22, 1970 to A. A. McRae, describes a visual ground helicopter pilot trainer. The pilot will sit in a chair and operate a joystick controller, and other suitable levers, for the purpose of remotely controlling a helicopter. This device will simulate the pilot's station within the helicopter. U.S. Pat. No. 3,564,134, issued on Feb. 16, 1971, to Rue et al., describes a system for flying a drone aircraft in which a first television camera is placed in the cockpit of the drone aircraft. As such, the person operating the remote control unit can visually see the movement of the airplane through the air in simulation of the actual pilofs view. U.S. Pat. No. 4,464,116, issued on Aug. 7, 1984 to R. J. Schoolcraft, describes a helicopter flight training device with a flight station that is a substantially actual size simulation of a helicopter cockpit. U.S. Pat. No. 5,015,187, issued on May 14, 1991 to D. W. Lord, describes a remote controlled helicopter having a video radio frequency link to a fixed control location, an airspeed display, a relative wind direction indicator and a pitch indicator.

It is an object of the present invention to provide a device for the operation of conventional remote control units associated with model aircraft.

It is another object of the present invention to provide a device which operates the remote control unit while simulating the actual controls utilized by pilots.

It is another object of the present invention to provide an apparatus which can be activated so as to rotate so that the aircraft can be easily viewed while the pilot is in a seated position.

It is another object of the present invention to provide an apparatus for operating the remote control of a model aircraft which can be folded and stowed for easy transportation and storage.

It is still another object of the present invention to provide an apparatus for operating a remote control of a model airplane which allows the pilot's feet to fully operate the remote control unit.

These and other objects and advantages of the present invention will become apparent from a reading of the attached specification and appended claims.

SUMMARY OF THE INVENTION

The present invention is an apparatus for operating a remote control unit associated with a model airplane. In particular, the apparatus of the present invention comprises a frame, a remote control unit received within the frame, a joystick controller cantably mounted to the frame, a first linkage connected to the joystick controller, and a second linkage connected to the joystick controller. The remote control unit has a first joystick element thereon. The joystick controller has a forward/backward movement and a side-to-side movement. The first linkage is connected to the first joystick element of the remote control unit. The first linkage is adapted to cause an up-and-down movement of the first joystick element relative to the forward/backward movement of the joystick controller. The second linkage is also connected to the first joystick element of the remote control unit. The second linkage is adapted to cause a side-to-side movement of the first joystick element relative to the side-to-side movement of the joystick controller.

The remote control unit also has a second joystick element. A pedal structure is pivotally mounted to the frame so as to be pivotable about a central axis. A third linkage is connected to the pedal structure and to the second joystick element. The third linkage is adapted to cause a side-to-side movement of the second joystick element relative to a pivotal movement of the pedal structure. The pedal structure includes a bar, a first pedal pivotally attached to one end of the bar and a second pedal pivotally attached to an opposite end of the bar. The first pedal is connected to the second pedal such that a pivoting of one pedal causes a corresponding pivoting of the other pedal.

The present invention also includes a throttle member pivotally connected to the frame. A fourth linkage is connected to the throttle member and to the second joystick element. The fourth linkage is adapted to cause an up-and-down movement of the second joystick element relative to a pivotal movement of the throttle member.

The present invention further includes a first wheel and a second wheel rotatably mounted to a forward end of the frame. A third wheel is rotatably mounted to a rearward end of the frame. The third wheel is rotatable in a plane transverse to a plane of rotation of the first and second wheels. In particular, a motor is mounted on the frame and drivingly connected to the third wheel. An actuator is connected to the motor and adapted to selectively actuate the motor so as to rotate the third wheel. The actuator is a switch which is mounted on the joystick controller.

In the present invention, a seat is removably affixed to a surface of the frame rearwardly of the joystick controller and facing the remote control unit.

In the present invention, the frame includes a horizontal frame portion and a vertical frame portion extending upwardly from the horizontal frame portion. The vertical frame portion is pivotally connected to the horizontal frame portion and adapted to fold upon the horizontal frame portion.

DETAILED DESCRIPTION OF THE INVENTION

Figure 1:
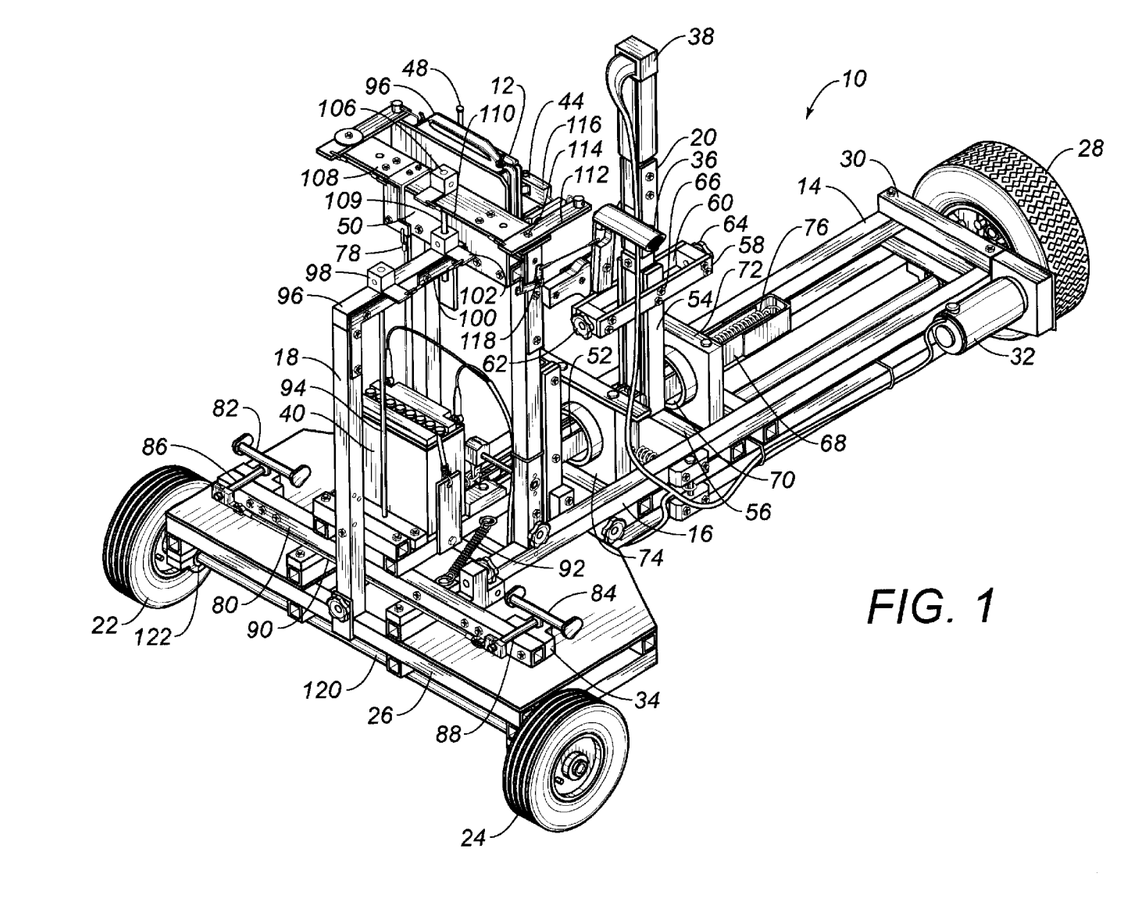
FIG. 1 is an upper perspective view of the apparatus of the present invention.

Referring to FIG. 1, there is shown at 10 the apparatus of the present invention for the operation of a remote control unit 12 for controlling the flight of a model airplane. The apparatus 10 includes a frame 14 having a horizontal portion 16 and a vertical portion 18. The remote control unit 12 is received within the vertical portion 18 of the frame 14. A joystick controller 20 is cantably mounted to the horizontal portion 16 of frame 14. The joystick controller 20 is configured so as to have a forward/backward movement and a side-to-side movement. A first wheel 22 and a second wheel 24 are rotatably mounted to the forward end 26 of the horizontal portion 16 of frame 14. A third wheel 28 is rotatably mounted to the rear end 30 of frame 14. The third wheel 28 is rotatable in a plane transverse to the planes of rotation of the first wheel 22 and the second wheel 24. A motor 32 is drivingly connected to the third wheel 28. Motor 32 is mounted on the horizontal portion 16 of frame 14.

In the present invention, in addition to the joystick controller 20, there is also a pedal structure 34 and a throttle member 36 which are further configured for the operation of the joystick elements associated with the remote control unit 12. An actuator 38 is connected to the joystick controller 20 so as to turn the motor 32 on and off for the driving of the third wheel 28. A battery 40 is mounted in the vertical portion 18 of frame 14 and is electrically connected to the actuator 38 and also to the motor 32.

In FIG. 1, small portions of the remote control unit 12 are illustrated. As will also be seen in the other figures, the remote control unit 12 includes a first joystick element 42 and a second joystick element 44. A handle 46 extends upwardly from the top of the remote control unit 12. An antenna 48 is provided on the remote control unit 12 so as to transmit signals from the remote control unit 12 to the model airplane in a conventional manner. It should be stressed that the remote control unit 12 is a conventional remote control unit which is commonly used for the flying of model airplanes. No modifications have been made directly to the remote control unit 12 in order to be used in the apparatus 10 of the present invention. As will be described hereinafter, certain items are attached to the joystick elements 42 and 44 so as to allow for the operation of the remote control unit 12.

The remote control unit 12 is secured within a housing 50 provided in the vertical portion 18 of the frame 14. Suitable brackets, as will be described hereinafter, can be used so as to properly secure the remote control unit in its desired position within the housing 50.

In the present invention, a first linkage 52 is connected to the joystick controller 20 and to the first joystick element 42. This first linkage 52 is designed and adapted so as to cause an upward and downward movement of the first joystick element 42 relative to the forward/backward movement of the joystick controller 20. The details associated with this first linkage will be described in the illustrations hereinafter.

However, in FIG. 1, it should be noted that support members 54 extend upwardly from a cross member 56 secured to the horizontal portion 16 of the frame 14. A position control frame 58 is secured to the tops of the support members 54 and around the exterior of the joystick controller 20. The joystick controller 20 is free to move forward and backward within the interior channel 60 of the position control frame 58. The limits of the movement of the joystick controller 20 are set by rotating knobs 62 and 64 inwardly or outwardly. The knobs 62 and 64, along with the position control frame 58, limit the ultimate movement of the joystick controller 20 so as to prevent excessive movement of the first joystick element 42. The support member 54 is also pivotally connected by pivotal connection 66 to the joystick controller 20. The joystick controller 20 at its bottom end is connected to bar 68. Bar 68 can slide forward and backward within the interior of a channel 70 formed in the interior of pillow blocks 72 and 74. The forward and backward movement of the bar 68 within channel 70 will actuate certain mechanisms (described hereinafter) so as to control the upward and downward movement of the first joystick element 42. A spring 76 is secured to the bar 68 at the rear end thereof. Spring 76 serves to urge the joystick controller 20 back to its home position. Another spring (not shown) is connected to the other end of the bar 68 so as to urge bar 68 and the connected joystick controller 20 back to a home position.

A second linkage 78 is interconnected to the joystick controller 20 and to the first joystick element 42. The second linkage 78 is adapted to cause a side-to-side movement of the first joystick element relative to the side-to-side movement of the joystick controller 20. As will be further described hereinafter, when the joystick controller 20 is moved from side to side, the channel 70 is rotated around the longitudinal axis thereof so as to cause an actuation of the various linkage elements which operate so as to cause the first joystick element 42 to move from side to side.

The second joystick element 44 is suitably controlled by the operation of the pedal structure 34 and by the operation of the throttle 36. The pedal structure 34 includes a bar 80 which is pivotally mounted at its center upon the horizontal portion 16 of frame 14. Foot-receiving members 82 and 84 extend from the bar 80 so as to provide a receptacle for feet. It can be seen that the foot-receiving member 82 is pivotally mounted to a receptacle on the bar 80. Similarly, the foot-receiving member 84 is pivotally mounted within a receptacle on the opposite end of the bar 80. Struts 86 and 88 extend from the foot-receiving members 82 and 84, respectively. A connecting rod 90 is connected at its opposite ends to the struts 86 and 88. As such, a pivotal movement of one of the foot-receiving members 82 and 84 will cause a corresponding pivoting movement in the other foot member. This allows the pedal structure 34 to be easily adapted to the feet of the user and to serve to maintain the feet of the user in a proper position during the rotation of the pedal structure 34. A spring 92 is connected to the bar 80 so as to cause the bar 80 to return to a home position. Another spring (not shown in FIG. 1) is on the opposite side of the bar 80 from spring 92. This arrangement of springs 92 will always urge the bar 80 to its proper home position in generally transverse relationship to the longitudinal axis of frame 14.

In operation, the pivotal movement of the pedal structure 34 will cause rod 94 to rotate about its axis. Rod 94 is received within a horizontal portion 96 of the vertical portion 18 of frame structure 14. A bracket 98 is mounted to the opposite end of rod 94 from pedal structure 34. A connector wire 100 extends from bracket 98 and is connected, at its opposite end, to another bracket 102. Bracket 102 has rod 104 extending therefrom which, in turn, connects to a receiving member 106 fastened onto a top plate 108. A connecting wire 110 will extend from receptacle 106 and connect with pivot plate 112. Pivot plate 112 will pivot about pivot point 114 so as to move the gripping member 116 to move the second joystick element 44 in side-to-side movement.

The throttle member 36 is connected by proper linkage 118 to the second joystick element 44 so as to cause upward and downward movement of the second joystick element 44. A more thorough discussion of such linkage will be described later.

In FIG. 1, it can be seen that an axle 120 connects the wheels 22 and 24 at the front 26 of frame 14. Each of the wheels 22 and 24 will rotate in parallel planes of rotation. Suitable bearings 122 at the bottom of frame 14 will receive the axle 120 so as to allow the free rotation of the axle 120 and the associated wheels 22 and 24.

In FIG. 1, the seat upon which the operator of the apparatus 10 sits has been removed for the purposes of illustration.

Figure 2:
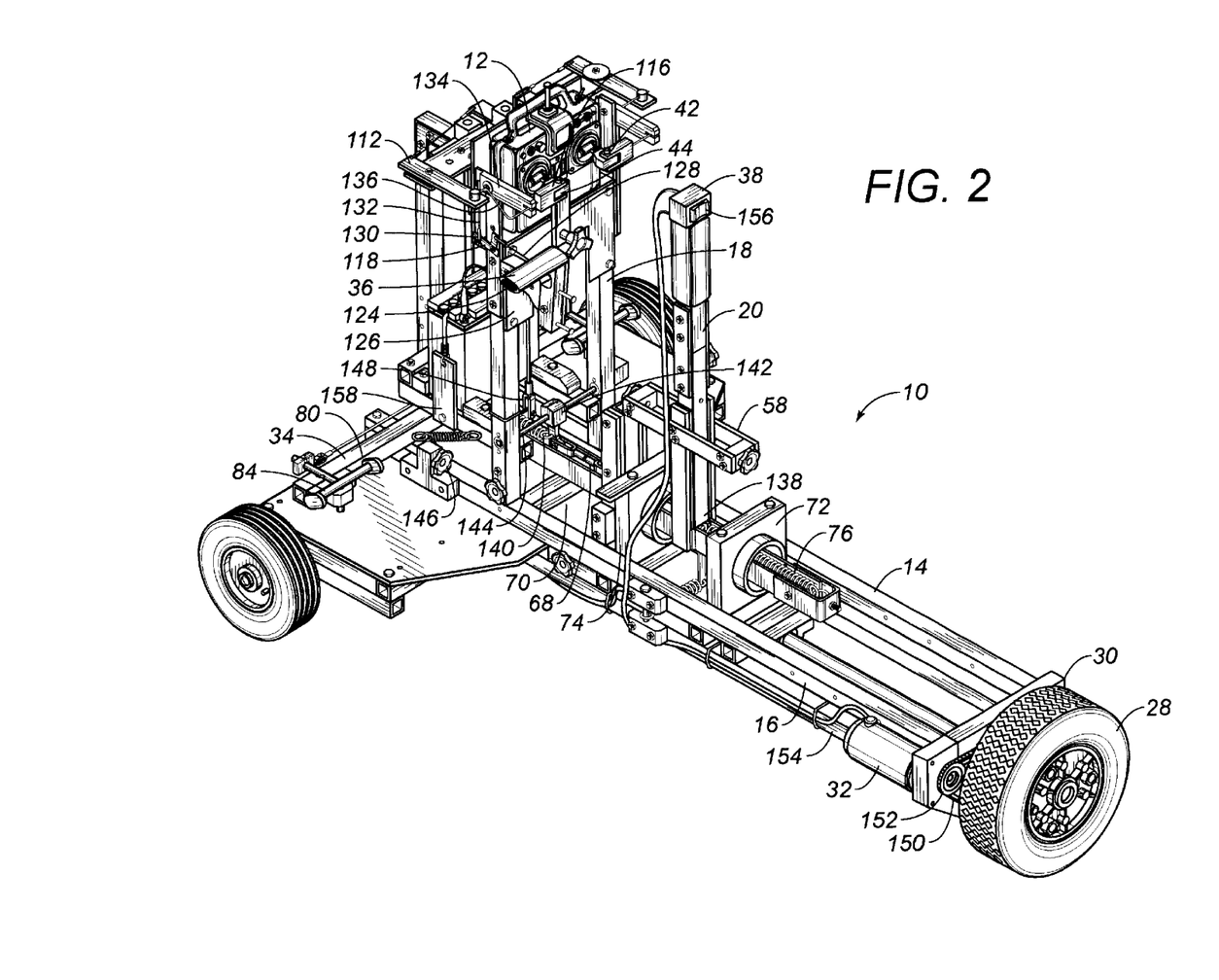
FIG. 2 is a rearward upper perspective view of the apparatus of the present invention.

FIG. 2 shows, with particularity, the throttle mechanism 36 with its associated linkage 118 for the control of the upward-and-downward movement of the second joystick element 44 associated with the remote control unit 12. FIG. 2 also shows the first joystick element 42 of the remote control unit 12.

As can be seen in FIG. 2, the throttle member 36 has a grip 124 extending outwardly from the vertical portion 18 of the frame 14. The grip 124 is pivotally connected to support structure 126 extending outwardly from the vertical portion 18 of the frame 14. A rigid connecting wire 128 will move inwardly or outwardly depending upon the direction of travel of the grip 124. The movement of connecting wire 128 will either push or pull the cantilevered arm 130 about its pivot point. Another rigid connecting wire 132 will extend upwardly so as to connect with one end of a slotted member 134. The slotted member 134 will cause the wire 136 to move upwardly or downwardly relative to the movement of the grip 124 of throttle member 36. It can be seen that the wire 136 extends from the pivot plate 112 associated with the linkage to the pedal structure 34. When the pivot plate 112 is pivoted outwardly or inwardly, the wire 136 will push the gripping member 116 to move the second joystick element 44 in a side-to-side manner. Since the wire 136 is rotatably mounted on the pivot plate 112, the slotted member 134 will cause the wire 136 to rotate at its end and thusly cause the gripping member 116 to cause the second joystick element 44 to move upwardly and downwardly. The side-to-side movement and the up-and-down movement can occur through all directions smoothly so that the joystick element 44 can carry out its normal operation.

In FIG. 2, it can be seen that the joystick controller 20 is pivotally mounted within the position control frame 58. The bottom end 138 is connected to the bar 68 so as to allow the bar 68 to move longitudinally within the channel 70. Spring 76 is connected to one end of the bar 68. A spring 140 is connected to the opposite end of the bar 68. As such, the springs 76 and 140 will cooperate so as to urge the joystick controller 20 back to its home position in a straight vertical orientation.

In FIG. 2, it can be seen that a forward/backward movement of the joystick controller 20 will cause the bar 68 to move forward or backward within the channel 70. This forward/backward movement will cause a corresponding pivoting movement of the support 142. Support 142 has axle 144 received within the vertical portion 18 of the frame 14. This connection will cause the proper actuation of the first joystick element 42, as will be described hereinafter.

In FIG. 2, it can be seen that the pedal structure 34 is mounted above the horizontal portion 16 of frame 14. The pedal structure 34 has a foot-receiving member 84 extending outwardly from bar 80. The actual pivotal movement of the bar 80 is limited by the operation of a knob 146. The rotation of knob 146 will adjustably limit the amount of pivotal travel of the bar 80. A corresponding knob similar to that of knob 146 will appear on the opposite side of the horizontal frame portion 16.

The joystick controller 20 is also capable of side-to-side movement. It can be seen that when the joystick controller 20 is moved side-to-side, the channel 70 will rotate within the interior of the pillow blocks 72 and 74. The rotation of the channel 70 will cause a suitable pivotal movement of a universal joint 148 having a rod extending upwardly within the vertical portion 18 of the frame 14. This operation will be described later hereinafter.

The rear wheel 28 is mounted to the end 30 of the frame 14. It can be seen that the motor 32 is also mounted to the horizontal portion 16 of frame 14. Motor 32 is drivingly connected to the wheel 28 through the use of a driving chain 150. The driving chain 150 is connected to a gear 152 located on the end of a shaft extending from the motor 32. The chain 150 will also extend around a larger gear associated with the axle of the third wheel 28. An electrical line 154 will extend along the horizontal portion 16 of frame 14 and upwardly so as to connect with actuator 38. The actuator 38 is a rocker switch 156. The rocker switch 156 can be actuated by the thumb of the user so as to cause the motor 32 to drive the wheel 28 in one direction or another. As such, the wheel 28 can be operated so as to pivot the apparatus 10 so as to face the flight of the model airplane. The unique arrangement of transverse rear wheel and parallel front wheels allows for proper pivotal action to occur. Power for the operation of the motor 32 is provided by battery 40. A bracket 158 secures the battery 40 within the vertical portion 18 of the frame 14.

Figure 3:
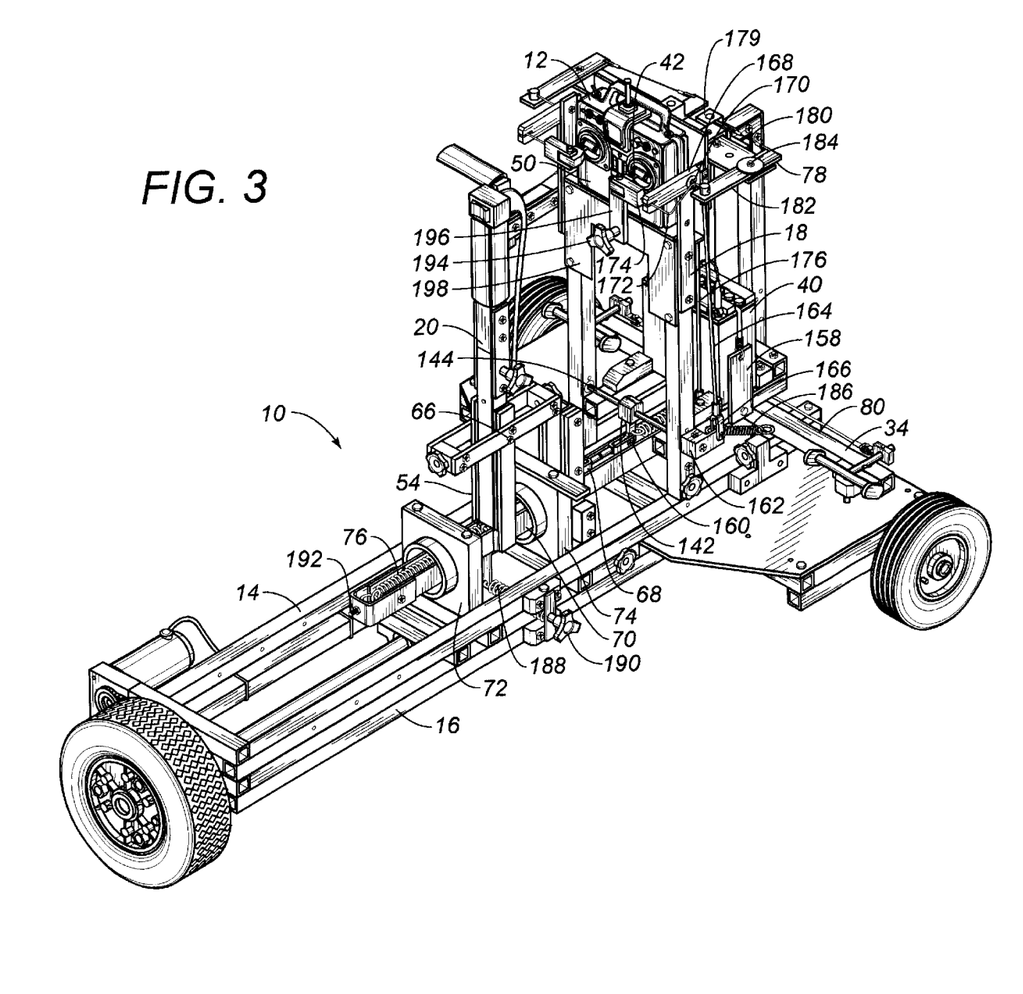
FIG. 3 is a rearward upper side view of the present invention as taken from the side opposite the side illustrated in FIG. 2.

FIG. 3 illustrates, with greater particularity, the actual operation of the joystick controller 20. When the joystick controller 20 is moved forward and backward, the joystick controller 20 will pivot within the support member 54 about pivot point 66. This will cause the bar 68 to move inwardly and outwardly within the channel 70. Since the bar 68 is pivotally connected at joint 160 to the support 142, the support 142 will correspondingly cause the axle 144 to rotate. The rotation of the axle will cause a corresponding pivotal movement of the bracket member 162 connected thereto. When the bracket member 162 rotates, this will cause the rod 164 to move upwardly and downwardly. Rod 164 is connected by joint 166 to the bracket member 162 and is connected, at its opposite end, to one end of the slotted member 168. Slotted member 168 is pivotally mounted at 170 to the vertical portion 18 of frame 14. A rigid wire 172 extends through the slot of the slotted member 168. Wire 172 has a gripping member 174 at its end. Gripping member 174 is connected to the first joystick element 42 of the remote control unit 12. The slot of the slotted member 168 allows the wire 172 to properly travel therethrough during the upward and downward movement of the wire 172 as caused by the slotted member 168 and its associated linkage 52.

The second linkage 78 allows the side-to-side movement of the joystick controller to create a side-to-side movement of the first joystick element 42. When the joystick controller 20 is moved from side-to-side, it causes a rotation of the channel 70 within the interior opening of pillow blocks 72 and 74. This rotation will cause the universal joint to move rod 176 so as to cause a corresponding rotation of receptacle 178. When receptacle 178 is rotated, it will cause connecting wire 180 to pull or push the end of pivot plate 182 inwardly or outwardly about pivot point 184. Correspondingly, the movement of the pivot plate 182 will cause a pulling or pushing movement on the wire 172 attached to an end thereof. This inward and outward movement of the wire 172 will cause the gripping member 174 to push the first joystick element from side to side. The slotted portion of the slotted member 168 will allow the wire 172 to move freely therein. As such, the joystick controller 20, through its respective linkages, causes the first joystick element 42 to move in correspondence with the movement of the joystick controller 20.

In FIG. 3, it can further be seen that the pedal structure 34 has a spring 186 connected to the bar 80 and connected to the vertical portion 18 of the frame 14. Spring 186, in combination with the spring on the opposite side of the vertical portion 18 of frame 14, will cause the pedal structure 34 to move to a home position.

In FIG. 3, it is noted that the joystick controller 20 can move from side to side. In order to establish a central home position relative to this side-to-side movement, a spring 188 is affixed at one end to the horizontal portion 16 of frame 14 and connected at the opposite end to a bottom of the joystick controller 20. Another spring (not shown in FIG. 3) will be located on the opposite side of the joystick controller. A control knob 190 is connected to the spring 188 so as to allow the operator of the apparatus 10 to control the tension on the joystick controller 20. Similarly, a control mechanism 192 is connected to the end of the spring 76 so as to allow the operator to control the tension in the forward/backward movement of the joystick controller 20.

In FIG. 3, it can be seen that the remote control unit 12 is received within housing 50. A locking knob 194 with its associated bracket 196 can be affixed to the face plate 198. The bracket 196 can be affixed to the face plate 198 on the vertical portion 18 of frame 14 by simply rotating the locking knob 194. This will cause the bracket 196 to firmly secure the remote control unit 12 within the housing 50. It is only necessary to rotate the locking knob 194 in an opposite direction so as to loosen the bracket 196 and allow for the removal of the remote control unit 12.

It can be seen in FIG. 3 that the battery 40 is secured within the bracket 158. Bracket 158 is securely fitted onto the vertical portion 18 of frame 14.

Figure 4:
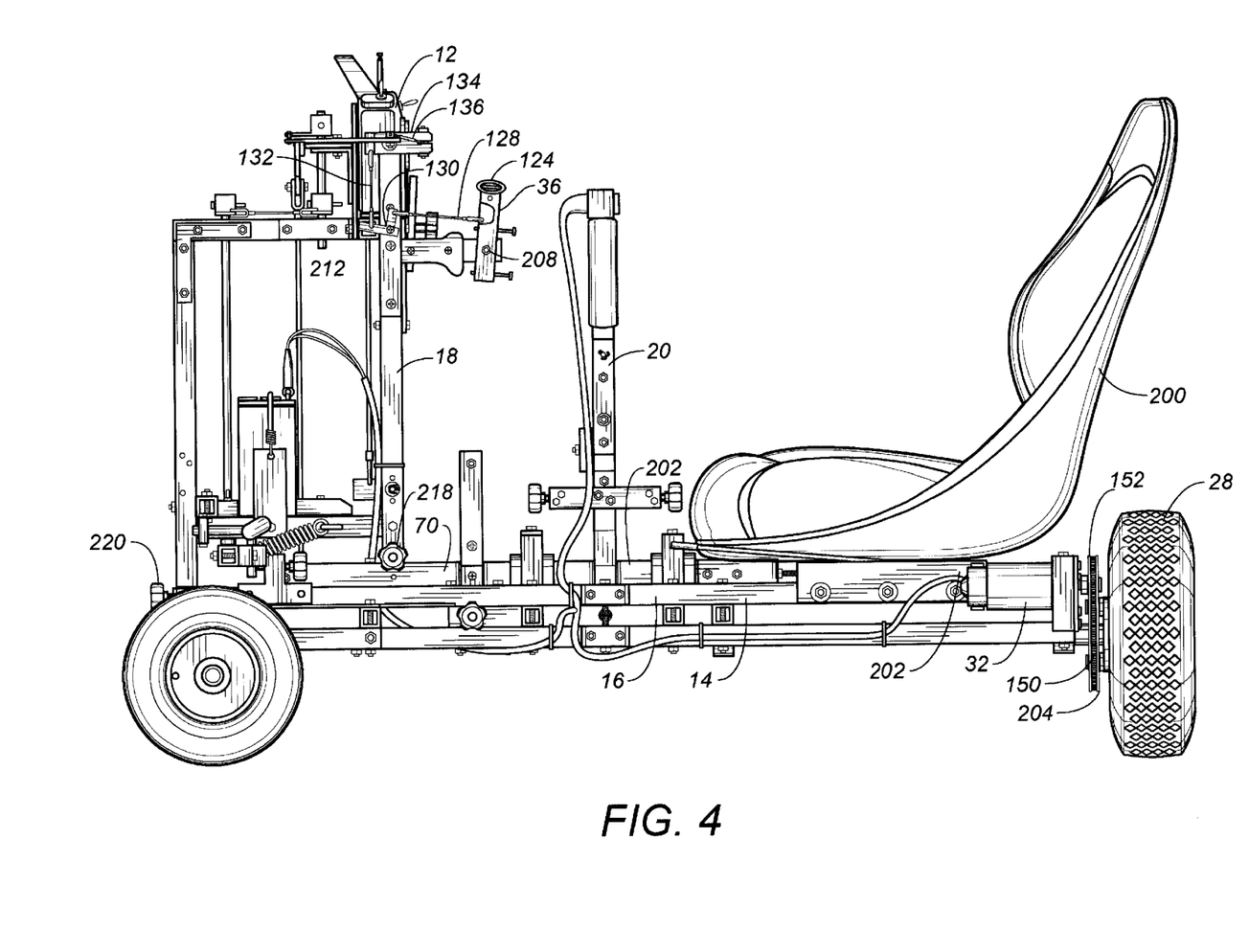
FIG. 4 is a side elevational view of the apparatus of the present invention.

FIG. 4 is a side view of the present invention. Unlike the previous illustrations of the present invention, FIG. 4 shows a seat 200 affixed onto the top surface 202 of the horizontal portion 16 of frame 14. The seat 200 has brackets 202 located on an underside thereof. Brackets 202 can be secured, by bolts or by other means, onto the horizontal portion 16 of the frame 14. The seat 200 is arranged so as to face the joystick controller 20 in the remote control unit 12. The wheel 28 is located behind the seat 200. The seat 200, through the use of bracket 202, can be easily removed from the frame 14 for the purposes of stowing and transportation.

In FIG. 4, the motor 32 is illustrated as positioned at the rear of the horizontal portion 16 of frame 14. A gear 152 extends outwardly from a shaft associated with motor 32. Chain 150 extends around gear 152 and also around a gear 204 associated with the axle of wheel 28. It can be seen that the wheel 28 will rotate in a plane transverse to the longitudinal axis of the horizontal portion 16 of frame 14.

The joystick controller 20 is illustrated in its vertical orientation or "home" position. The throttle member 36 is arranged on the opposite side of the joystick controller 20 from the seat 200. The throttle member 36 includes grip 124 on a top surface thereof. FIG. 4 clearly illustrates how the throttle member 36, and its associated linkage, causes the operation of the second joystick element 44. The throttle member 36 has the grip 124 connected to structural members 206. Structural member 206 is pivotally mounted at 208 to the outwardly extending arm 210. A rigid connecting wire 128 is connected to the structural member 206 between the grip 124 and the pivot point 208. A rigid connecting wire 128 has its opposite end connected to cantilevered arm 130. Cantilevered arm 130 is pivotally mounted at 212 to the vertical portion 18 of frame 14. Another rigid connecting wire 132 extends from the cantilevered arm 130 so as to be connected, at its opposite end, to the slotted member 134. The wire 136 will extend into the slot of the slotted member 134. Since slotted member 134 is pivotally connected to the vertical portion 18, it will cause the wire 136 to move upwardly and downwardly within the slot. As such, the upward and downward movement of the second joystick element 44 is achieved.

An important aspect of the present invention is the ability to fold the vertical portion 18 of the frame 14 onto the horizontal portion 16. FIG. 4 shows the completely assembled arrangement of the vertical portion 18. A securing knob 218 serves to lock the vertical portion in its transverse relationship to the horizontal portion 16. Another knob 220 at the forward end 26 of the frame 14 can serve to release the vertical portion 18 from its transverse relationship to the horizontal portion 16.

Figure 5:
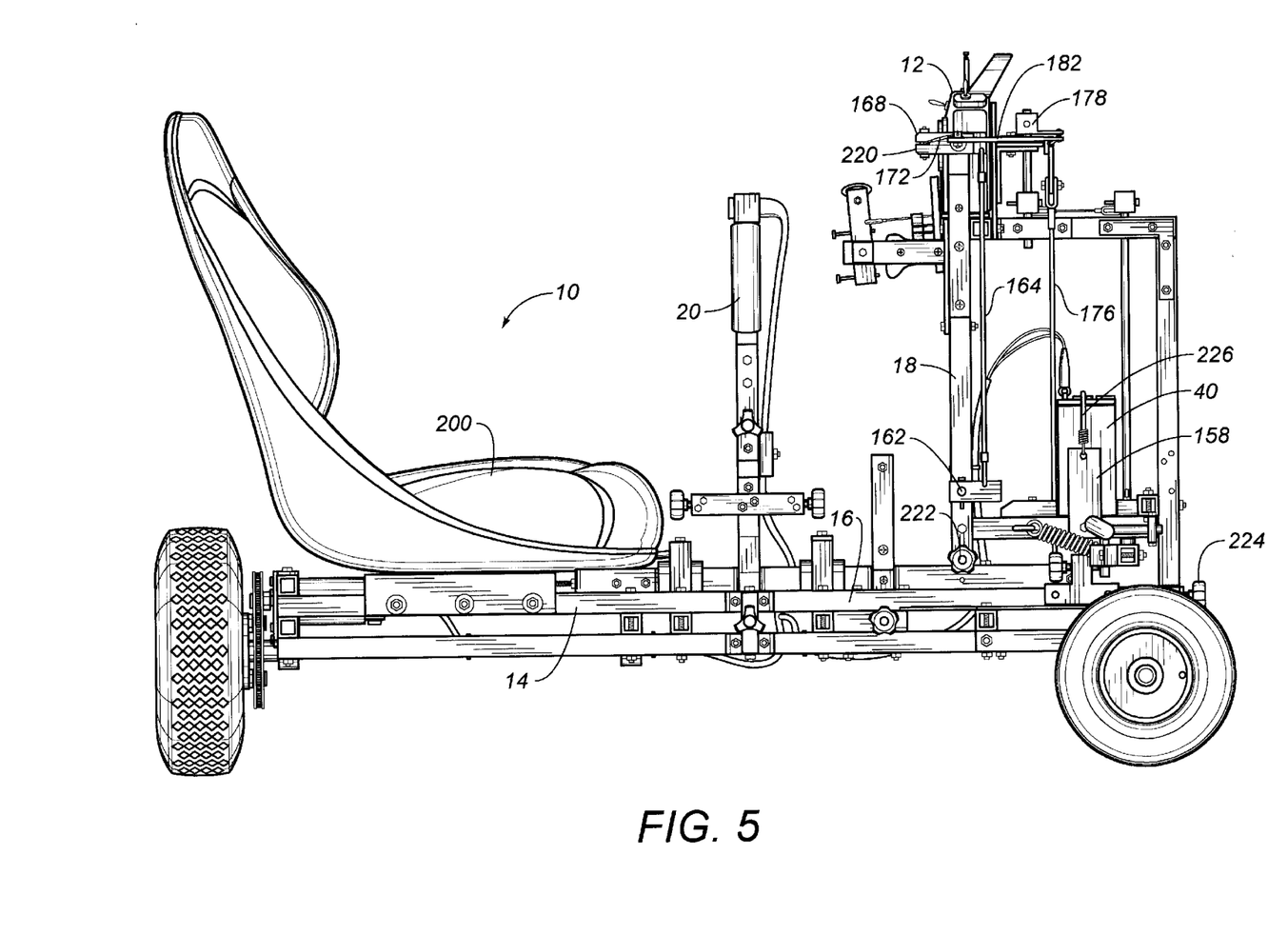
FIG. 5 is an opposite side elevational view of the apparatus of the present invention.

FIG. 5 shows the opposite side of the apparatus 10 from that shown in FIG. 4. In particular, FIG. 5 shows that the seat 200 is suitably positioned above the frame 14 in a position behind the joystick controller 20. The linkage mechanism associated with the joystick controller 20 is further illustrated, with particularity, in FIG. 5. Initially, for the up-and-down movement of the first joystick element on the remote control unit 12, the backward and forward movement of the joystick controller 20 will cause a rotation of the bracket member 162. Bracket member 162 is connected to the axle which extends through the vertical portion 18 of frame 14. Rod 164 has one end connected to the bracket member 162 and the opposite end connected to the end of the slotted member 168. The wire 172 will extend through the slot 220 in the slotted member 168.

The side-to-side movement of the joystick controller 20 causes a rotational movement of the rod 176. This rotational movement will cause receptacle 178 to rotate so as to cause the pivot plate 182 to move the wire 172 inwardly and outwardly.

FIG. 5 also shows that the vertical portion 18 of frame 14 is secured to the horizontal portion 16 through the use of another securing knob 222 and another release knob 224. Also, in FIG. 5, the battery 40 is secured within bracket 158 having tying element 226 extending thereover.

Figure 6:
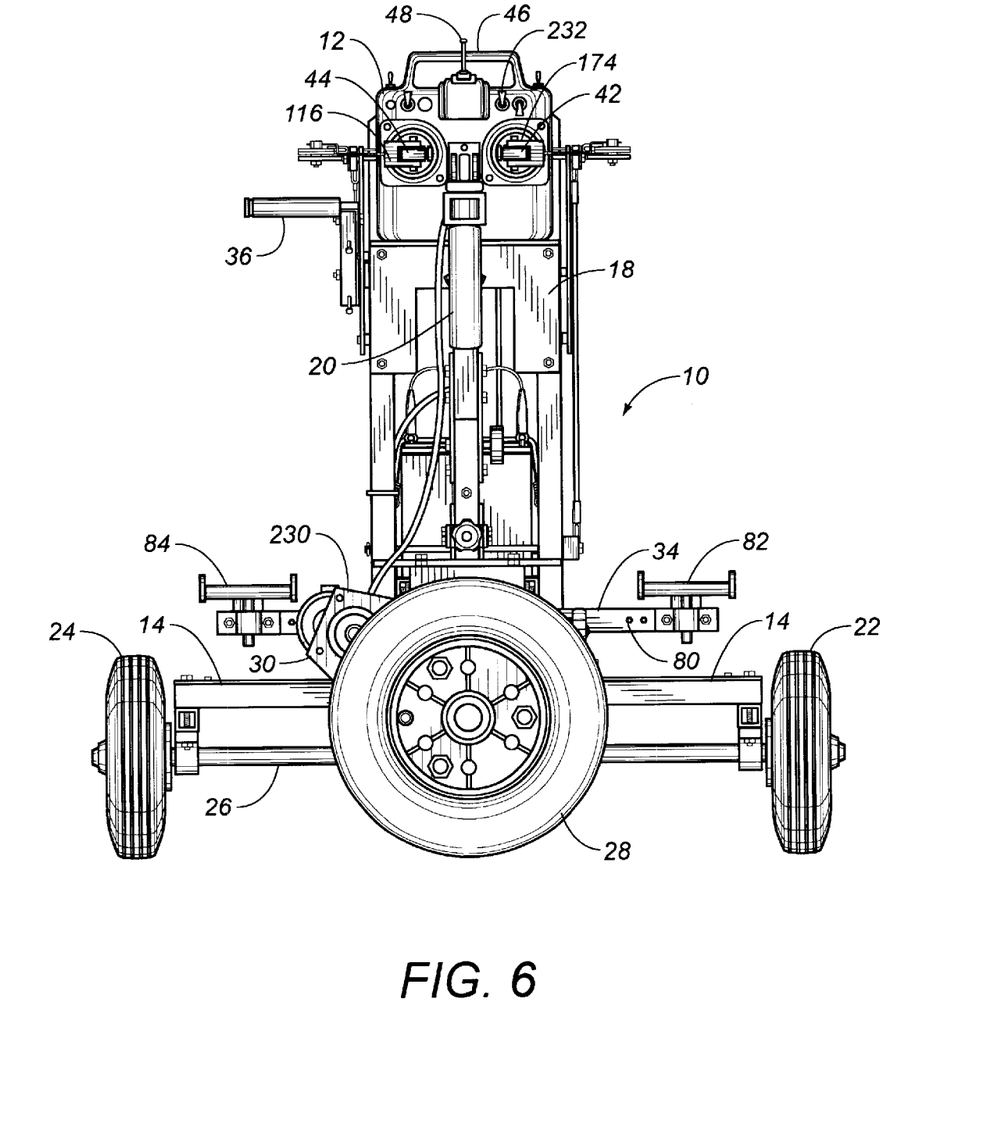
FIG. 6 is a rear view of the apparatus of the present invention with the seat removed.

FIG. 6 is an end view of the apparatus 10 with the seat removed. In FIG. 6, wheels 22 and 24 extend outwardly from the sides of frame 14. Axle 26 extends thereacross so as to allow the wheels 22 and 24 to be rotatably mounted within the frame 14. Third wheel 28 extends downwardly in a plane transverse to the plane of wheels 22 and 24. The rotation of the wheel 28 will cause a pivotal movement of the wheels 22 and 24 with respect to each other so that the apparatus 10 will rotate when actuated. A motor support frame 230 extends outwardly from the rear 30 of the frame 14. The pedal structure 34 is arranged so as to be in a proper position for the receipt of feet within foot-receiving members 82 and 84. The pivotal connecting of the foot-receiving members 82 and 84 will always assure that the feet are in a position with the soles of the feet generally facing a proper direction during the rotation of the bar 80 about its central axis. This avoids any awkward positioning of the fact.

FIG. 6 shows that the joystick controller 20 extends upwardly centrally. The remote control unit 12 is positioned in front of the joystick controller 20 so as to face the person sitting in seat 200. The remote control unit 12 has first joystick element 42 and second joystick element 44. It can be seen that the respective gripping members 174 and 116 have a U-shaped configuration. Suitable mechanisms can be installed onto the gripping members 116 and 174 so as to assure a strong and secure contact with the first and second joystick elements. The remote control unit 12 includes a plurality of switches 232 arranged thereon for the operation of certain mechanisms associated with the flying of the model airplane. Handle 46 extends from the top of the remote control unit 12. An antenna 48 is illustrated in its retracted position at the top of the remote control unit 12. The throttle member 36 extends outwardly from the side of the vertical portion 18 of frame 14.

Figure 7:
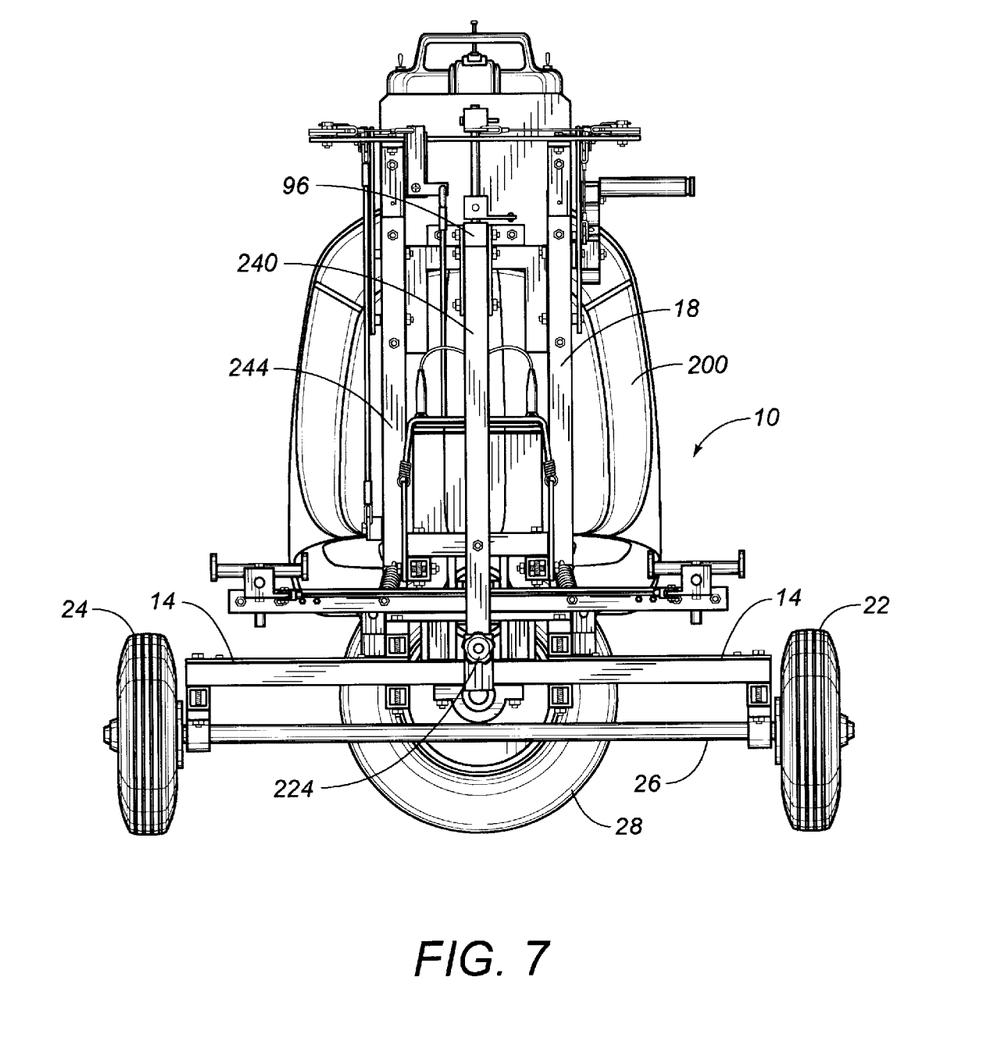
FIG. 7 is a frontal view of the apparatus of the present invention.

FIG. 7 shows a frontal view of the apparatus 10. In FIG. 7, the seat 200 is positioned behind the vertical portion 18 of frame 14. The wheels 22 and 24 are connected by axle 26 therebetween. The rear wheel 28 is located centrally between the wheels 22 and 24. FIG. 7 shows that the release knob 224 is positioned on the front of the vertical portion 18 of the frame 14. The vertical portion 18 of the frame 14 will include the frontal member 240 extending upwardly to a horizontal member 96. Horizontal member 96 extends toward the seat 200 so as to be connected with square shaped frame section 244.

Figure 8:
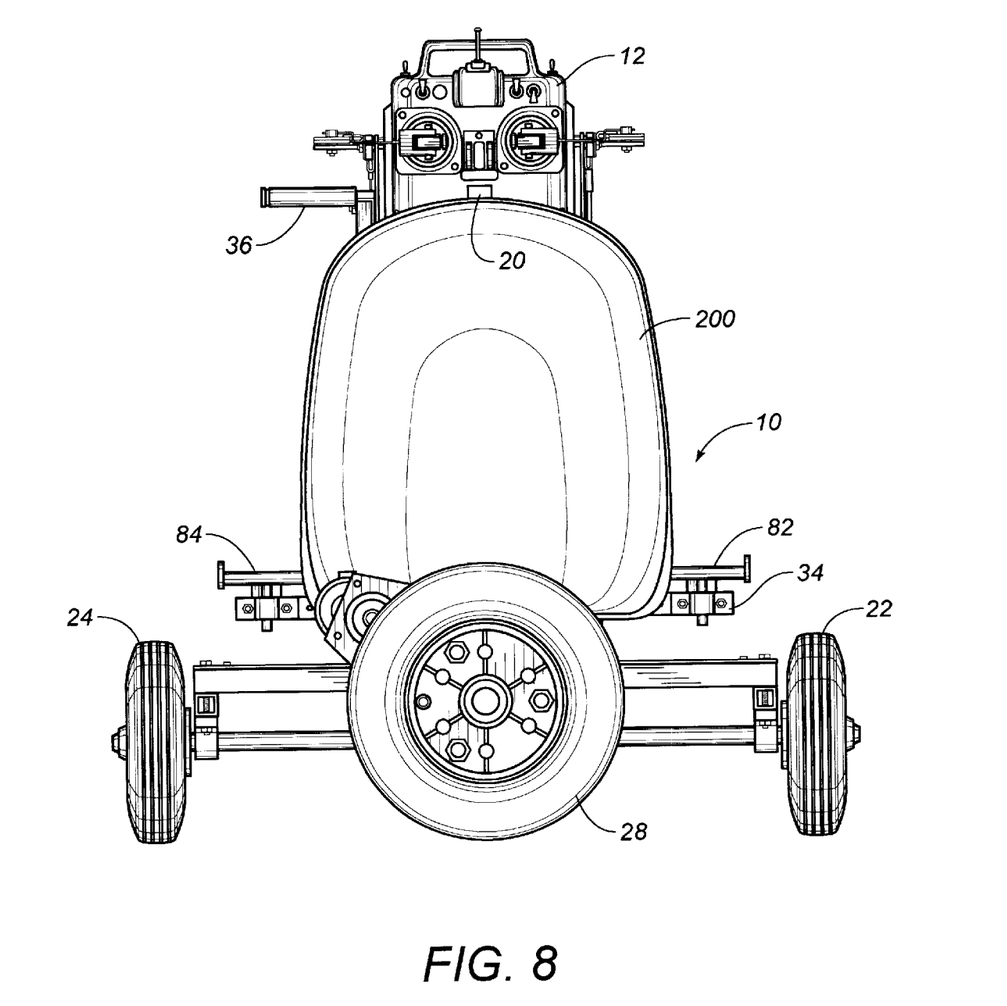
FIG. 8 is a rear view of the apparatus of the present invention with the seat installed.

In FIG. 8, the apparatus 10 is illustrated with the back of seat 200 in its proper position. The pedal structure 34 extends outwardly beyond the sides of the seat 200. The throttle member 36 extends above the seat 200 in a proper position for reaching by the operator of the apparatus 10. The remote control unit 12 is shown in a proper position for viewing by the operator of the apparatus 10. In operation, the operator will sit in the seat 200 and face the remote control unit 12. The operator will also place one hand on the joystick controller 20, another hand on the throttle member 36, and his feet are placed into the foot-receiving members 82 and 84. When the airplane is in a flying condition, the operator can follow the path of the airplane by simply actuating the rocker switch on the joystick controller 20 so as to cause the rear wheel 28 to rotate and properly pivot the apparatus 10 about the front wheels 22 and 24.

Figure 9:
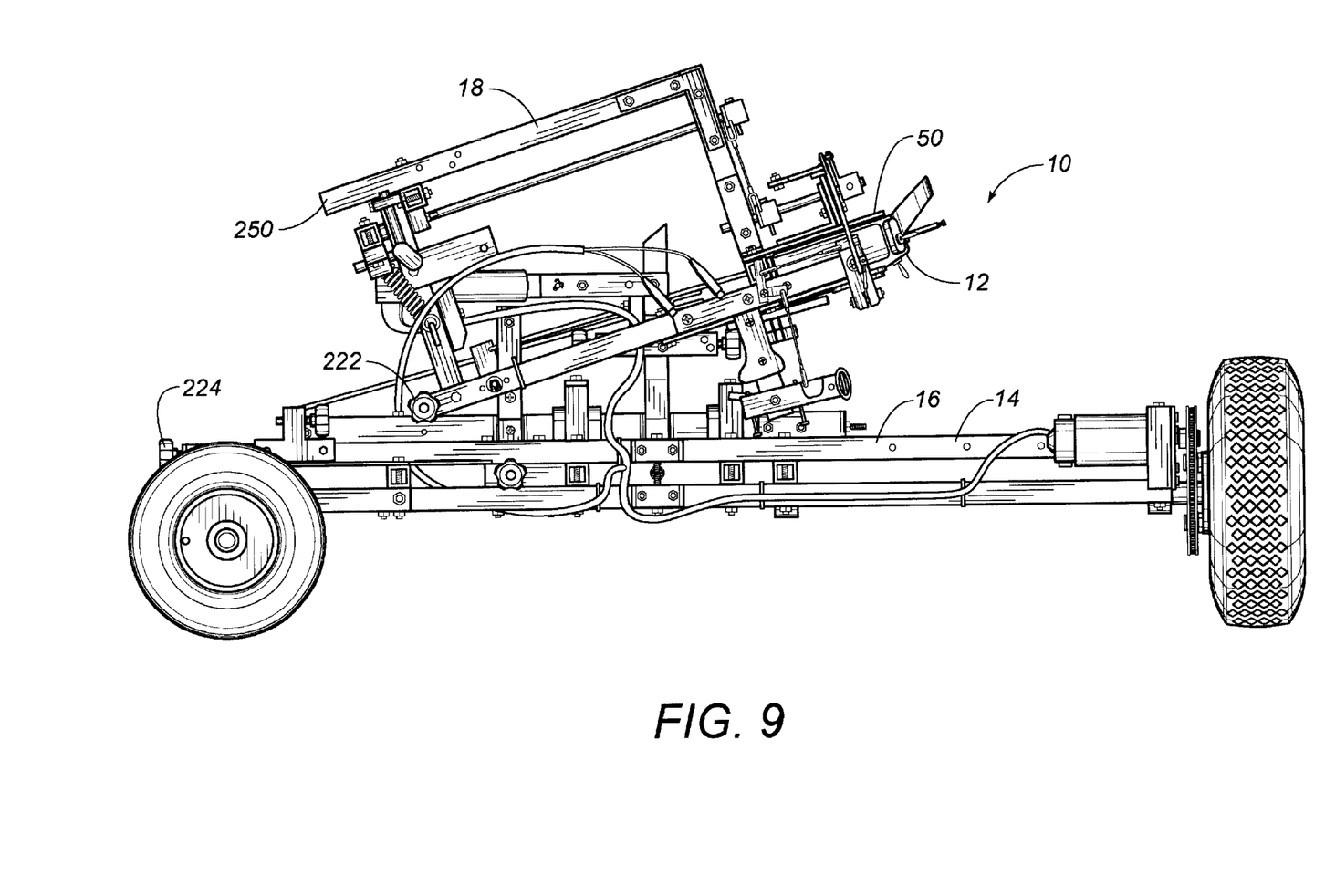
FIG. 9 is a side elevational view of the present invention showing the pivoting of the vertical portion of the frame with respect to the horizontal portion of the frame.

FIG. 9 shows how the vertical portion 18 of frame 14 is released and positioned for stowing on the horizontal portion 16. Initially, the release knob 224 is rotated so as to release the end 250 of the vertical portion 18 from its position. The securing knob 222 is also rotated so as to release the vertical portion 18 from its secure position. In this arrangement, the vertical portion 18 can be rotated so as to reside flat on the top surface of the horizontal portion 16. The apparatus 10 is properly configured so that when the vertical portion 18 is folded upon the horizontal portion 16, the apparatus 10 will easily fit within a sport utility vehicle or within the bed of a pickup truck. In certain circumstances, the apparatus 10 can also be placed into the interior of a van. Since the remote control unit 12 is properly secured within its housing 50, the remote control unit 12 does not have to be removed during the storage. Despite the fact that the vertical portion 18 is folded, none of the linkages require disconnection or disassembly.

Figure 10:
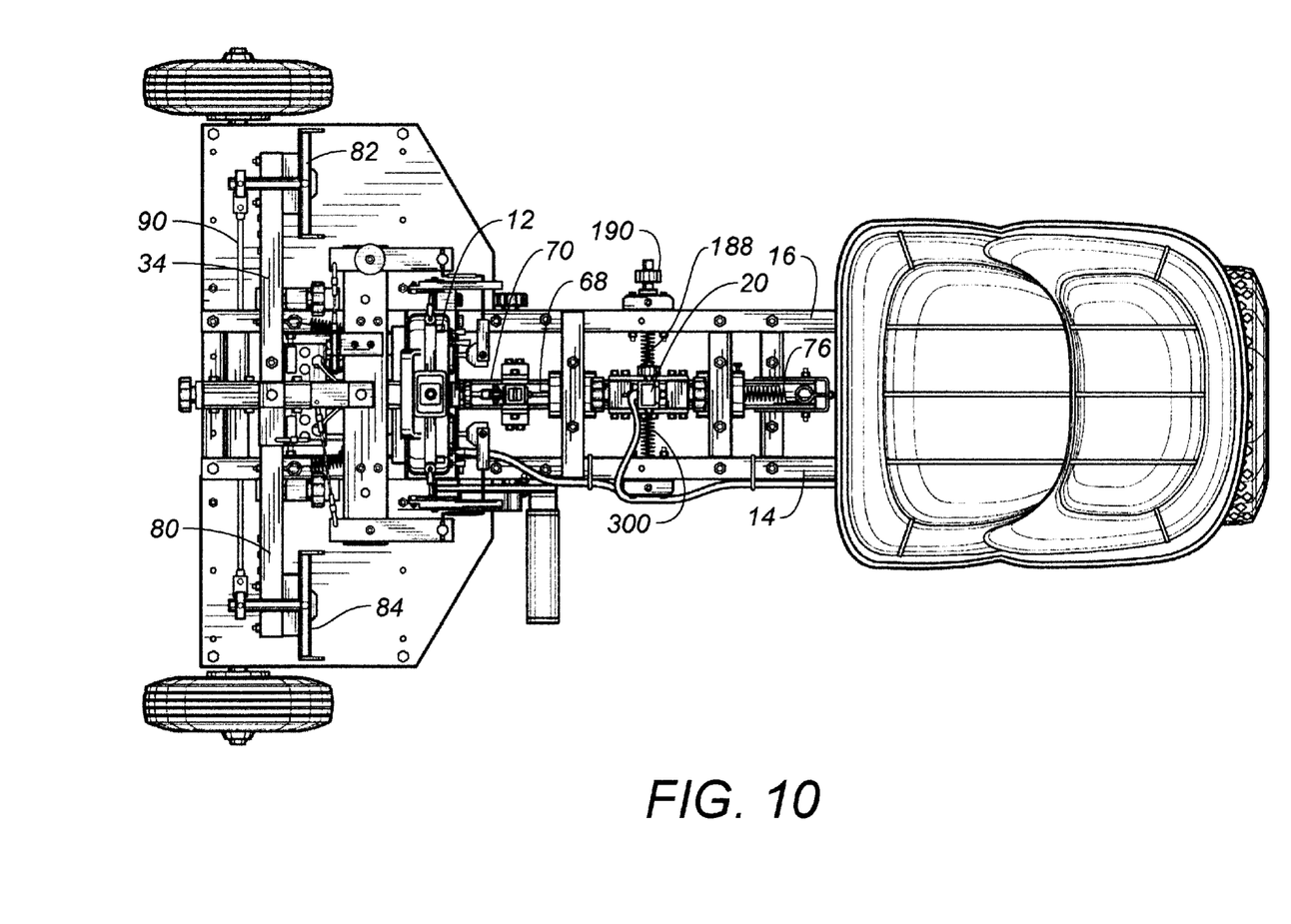
FIG. 10 is a plan view of the apparatus of the present invention.

FIG. 10 shows a plan view of the present invention. In FIG. 10, certain aspects of the present invention are illustrated with greater clarity. Initially, it can be seen that the joystick controller 20 extends upwardly centrally of the horizontal portion 16 of frame 14. Bar 68 extends through the interior of the channel 70 so as to carry out the proper linkage with the various joystick elements associated with the remote control unit 12. Spring 76 is connected to the bar 68 at one end. Spring 76, along with the spring at the opposite end of the bar 68, provides resistance to the forward/backward motion of the joystick controller 20. The spring 76, along with the spring at the opposite end of the bar 68, also creates a "centering" effect for the joystick controller 20.

A centering effect of the joystick controller relative to the side-to-side motion is established through the use of spring 188 and spring 300. A tensioning knob 190 is connected to the spring 188 so as to make proper adjustments for the resistance to side-to-side motion of the joystick controller.

FIG. 10 also shows the pedal structure 34 having foot-receiving members 82 and 84 at opposite ends of the bar 80. The foot-receiving members 82 and 84 are connected together by connecting rod 90. As such, when the bar 80 is rotated by applying pressure to one or both of the foot-receiving members 82 and 84, the connecting rod 90, along with the pivotal placement of the foot-receiving members 82 and 84 will assure that the feet reside in a proper position during the rotation of bar 80.

Figure 11:
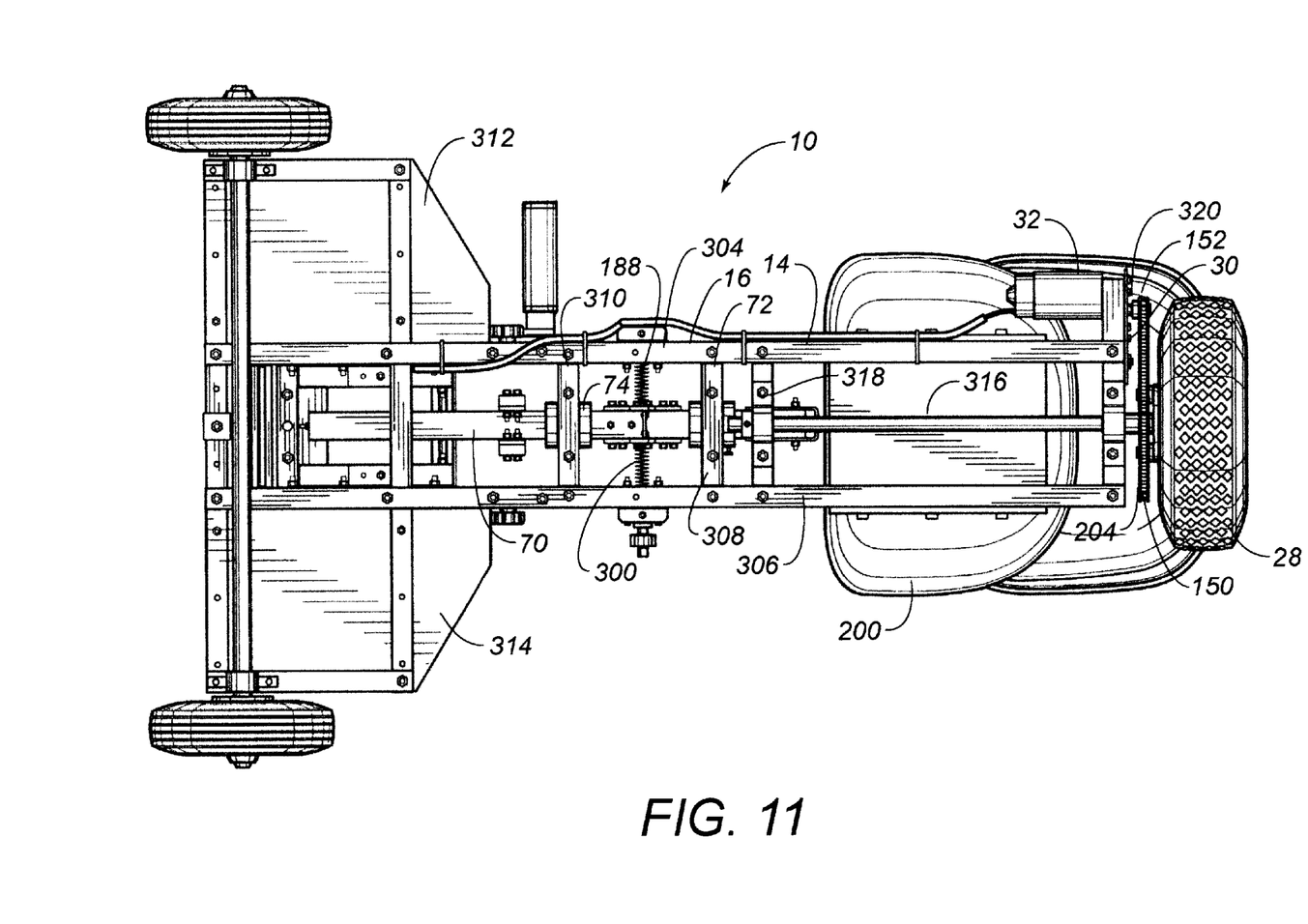
FIG. 11 is a bottom view of the apparatus of the present invention.

FIG. 11 shows the bottom view of the apparatus 10 of the present invention. In FIG. 11, it can be seen that the horizontal portion 16 of frame 14 has a generally square configuration. Cross members extend between the sides 304 and 306 so as to assure structural integrity of the device. The pillow blocks 72 and 74 are placed on cross members 308 and 310 respectively. Springs 188 and 300 assure proper centering of the joystick controller.

In FIG. 11, it can be seen that the channel 70 extends through the pillow blocks 72 and 74. A pair of foot resting panels 312 and 314 extend outwardly from the sides 304 and 306 of frame 14. The panels 312 and 314 provide an area whereby the user of the apparatus can rest his or her feet when the pedal structure 34 is not in use.

In FIG. 11, the rear wheel 28 has its axle 316 extending from the rear 30 of frame 14 to a support cross member 318. As such, the axle 316 will extend below the bottom of seat 200. This arrangement gives the axle 316 strong structural integrity and prevents deflection during use. It also adds further support to the structural integrity of the frame 14. Motor 32 is illustrated as having shaft 320 extending outwardly therefrom. Shaft 320 has gear 152 affixed thereto. Chain 150 will extend around gear 152 and also a gear 204 associated with the rear wheel 28. Since the gear 204 is a larger gear than the gear 152, the wheel 28 will rotate relatively slowly in comparison with the rotation of the shaft 320 associated with motor 32.

The control of the joystick elements of the remote control unit allows for the proper manipulation of an aircraft controlled by the remote control unit. The up and down movement of the first joystick element will serve to control the movement of the elevator on the wing of the airplane. As such, the forward/backward movement of the joystick controller 20 acts to control directly the movement of the model airplane elevator. The side-to-side movement of the joystick controller creates a side-to-side movement of the first joystick element of the remote control unit 12. This side-to-side movement will control the ailerons on the end of the wings of the model airplane.

The pedal structure causes a side-to-side movement of the second joystick element on the remote control unit. These pedals will act as controls of the rudders. These rudders are associated with the vertical flap on the back of the airplane. The throttle serves to move the second joystick element upwardly and downwardly. As such, the throttle will serve to control the amount of power produced by the engine of the model airplane and to control the speed of the airplane. The various switches on the remote control unit can be operated by simply reaching the switches.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. An apparatus comprising:

a frame;

a remote control unit received within said frame, said remote control unit having a first joystick element and a second joystick element, a joystick controller cantably mounted to said frame so as to have a forward/backward movement and a side-to-side movement, a first linkage connected to said joystick controller and to said first joystick element of said remote control unit, said first linkage adapted to cause an up-and-down movement of said first joystick element relative to the forward/backward movement of said joystick controller, and a second linkage connected to said joystick controller and to said first joystick element of said remote control unit, said second linkage adapted to cause a side-to-side movement of said first joystick element relative to the side-to-side movement of said joystick controller;

a foot receiving structure pivotally mounted to said frame so as to be pivotable about a central axis, said foot receiving structure comprising:

a bar;

a first pedal pivotally attached about a vertical axis to one end of said bar; and a second pedal pivotally attached about a vertical axis to an opposite end of said bar, said first pedal connected to said second pedal such that a pivoting of one pedal causes a corresponding pivoting of the other pedal; and a third linkage connected to second foot receiving structure and to said second joystick element, said third linkage adapted to cause a side-to-side movement of said second joystick element relative to a pivotal movement of said foot receiving structure.

2. An apparatus comprising:

a frame;

a remote control unit received within said frame, said remote control unit having a first joystick element;

a joystick controller cantably connected to said frame;

a joystick linkage connected to said joystick controller and to said first joystick element and adapted to cause a movement of said first joystick element relative to a movement of said joystick controller;

a front wheel rotatably mounted to a forward end of said frame;

a rear wheel rotatably mounted to a rearward end of said frame, said rear wheel rotatable in a plane transverse to a plane of rotation of said front wheel;

a motor mounted on said frame and drivingly connected to said rear wheel; and an actuator connected to said motor and adapted to selectively actuate said motor so as to rotate said third wheel.

3. The apparatus of claim 2, said actuator comprising a switch mounted on said joystick controller.

4. The apparatus of claim 2, said front wheel comprising:

a first wheel rotatably mounted at one side of said frame; and a second wheel rotatably mounted at an opposite of said frame, said first and second wheels being rotatable in parallel planes.

5. An apparatus comprising:

a frame;

a remote control unit received within said frame, said remote control unit having a joystick element;

a pedal structure pivotally connected to said frame so as to be pivotable about a central vertical axis, said pedal structure comprising a first pedal affixed to one end of a bar and a second pedal affixed to an opposite end of said bar, said bar affixed to a rod member at said central vertical axis; and a pedal linkage connected to said pedal structure and to said joystick element, said pedal linkage adapted to cause a movement of said joystick element relative to a pivotal movement of said pedal structure.

6. The apparatus of claim 5, further comprising:

a throttle member pivotally connected to said frame; and a throttle linkage connected to said throttle member and to said joystick element, said throttle linkage adapted to cause a movement of said joystick element relative to a pivotal movement of said throttle member.

7. The apparatus of claim 6, said pedal linkage adapted to cause a side-to-side movement of said joystick element relative to the pivotal movement of said pedal structure, said throttle linkage adapted to cause an up-and-down movement of said joystick element relative to the pivotal movement of said throttle member.

* * * * *